DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED OCTOBER 7, 1975

939 O.G. 11

T939,016

PRODUCTION OF FLEXIBLE POLYURETHANE FOAM

Ted L. Douglas and Ambrose J. Clonce, Jr., both of Rte. 11, Kingsport, Tenn. 37663

Continuation of abandoned application Ser. No. 401,328, Sept. 27, 1973. This application Oct. 30, 1974, Ser. No. 519,320

**Int. Cl. C08g *18/18***

U.S. Cl. 260—2.5 AC

No Drawing. 16 Pages Specification

Flexible, resilient polyurethane foam is produced by using, as a curing catalyst, a mixture of 65–83% N,N'-dialkyl-2,4-toluenediamine and 35–17% N-monoalkyl-2,4-toluenediamine, in which the alkyl groups contain from 3–12 carbon atoms.